(No Model.)　　　　　　　　　　　　　　　　2 Sheets—Sheet 1.
H. W. MORROW.
FASTENING FOR TRAVELING BAGS OR VALISES.
No. 378,016.　　　　　　　　　Patented Feb. 14, 1888.
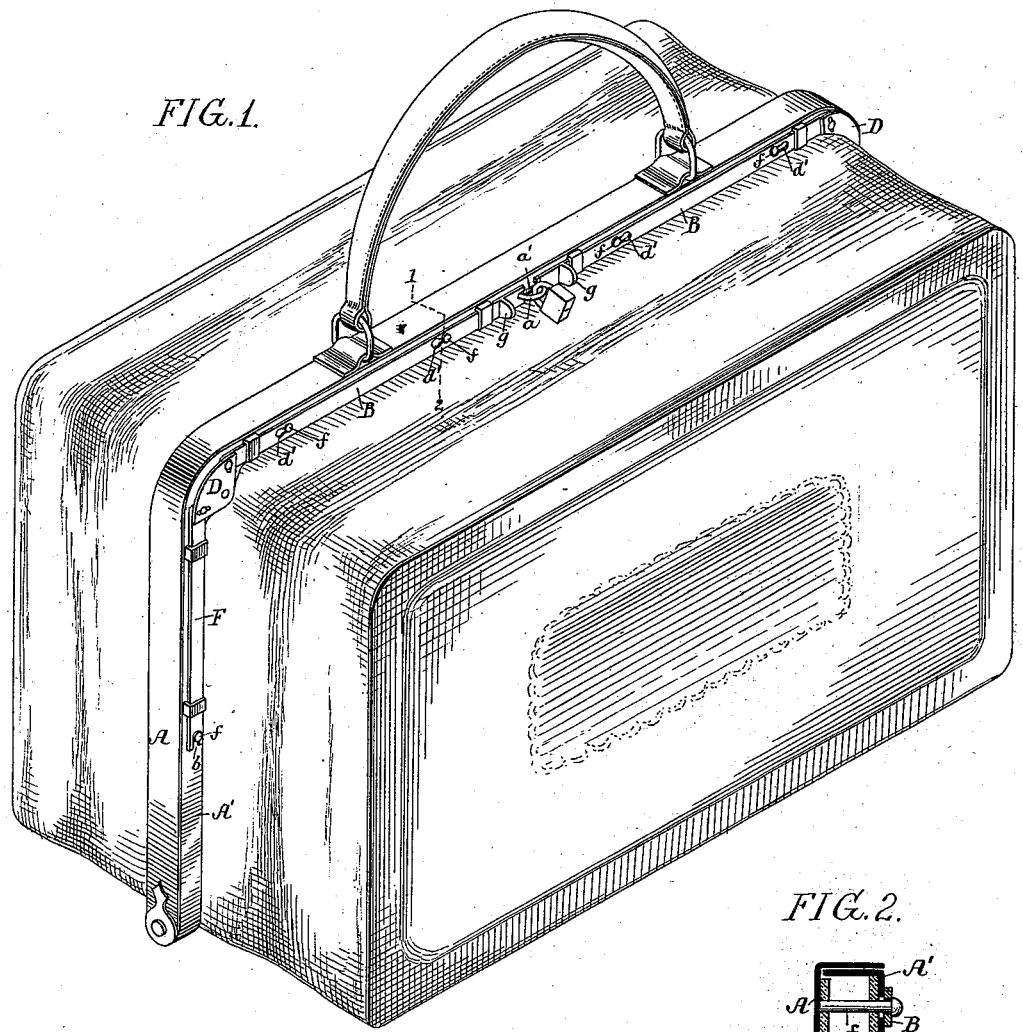
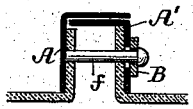
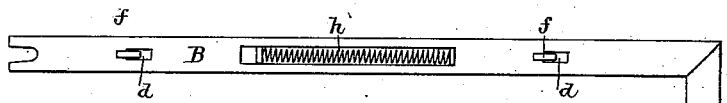
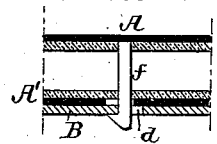
Witnesses
Jno. E. Parker
Alex Barkoff
Inventor,
Henry W. Morrow,
By his Attorneys
Howson & Howson

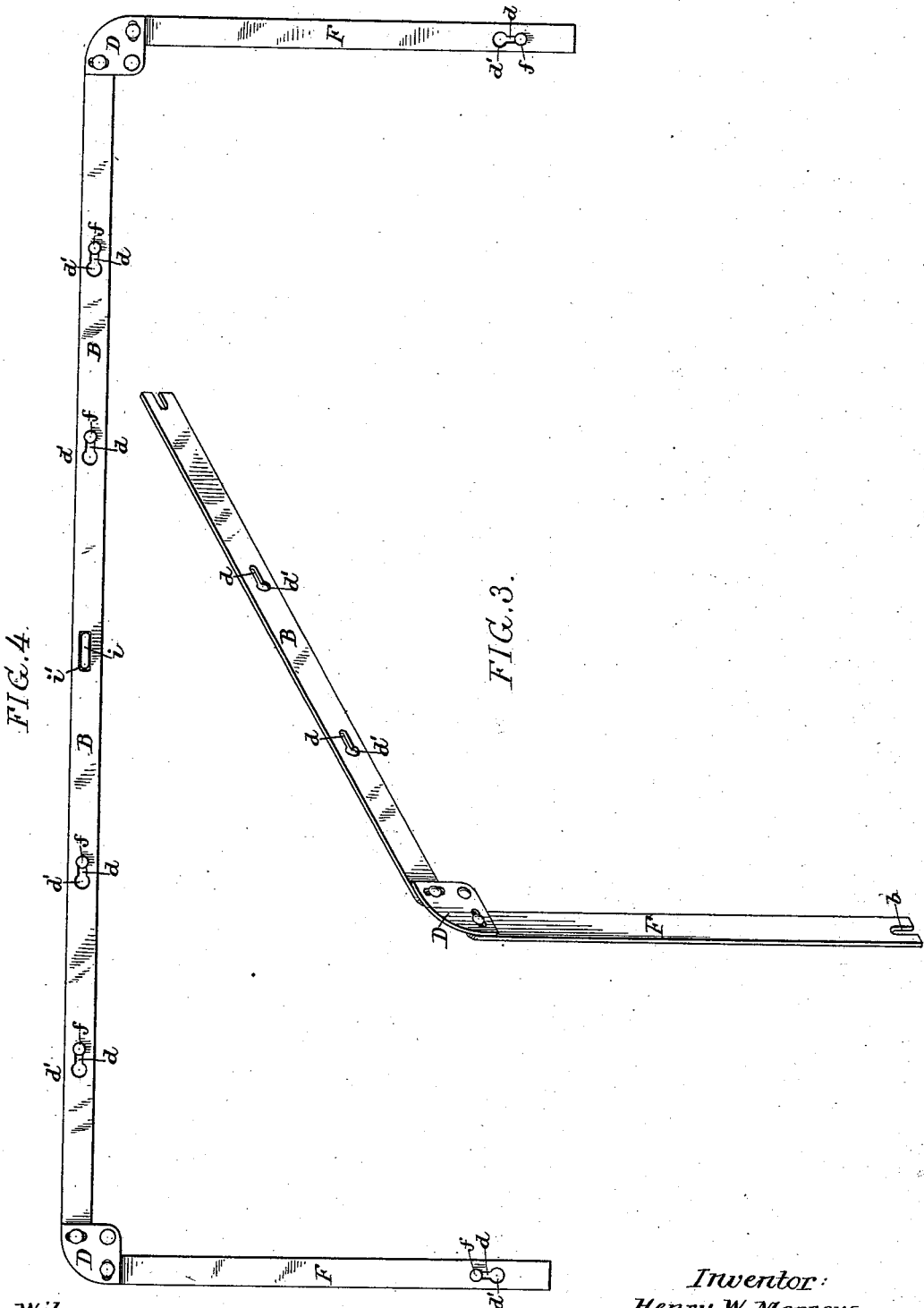

United States Patent Office.

HENRY W. MORROW, OF WILMINGTON, DELAWARE.

FASTENING FOR TRAVELING-BAGS OR VALISES.

SPECIFICATION forming part of Letters Patent No. 378,016, dated February 14, 1888.

Application filed October 24, 1887. Serial No. 253,159. (No model.)

*To all whom it may concern:*

Be it known that I, HENRY W. MORROW, a citizen of the United States, and a resident of Wilmington, New Castle county, Delaware, have invented certain Improvements in Fastenings for Bags or Valises, of which the following is a specification.

The object of my invention is to so construct a fastener for traveling-bags or valises that the frame of the bag will be securely retained at the sides as well as at the top. This object I attain in the manner which I will now proceed to describe, reference being had to the accompanying drawings, in which—

Figure 1 is a perspective view of a traveling-bag or valise provided with my improved fastening device; Fig. 2, an enlarged transverse section on the line 1 2; Fig. 3, a detached view of part of the bolt mechanism; and Figs. 4, 5, and 6, views illustrating modified forms of said bolt mechanism.

A A' are the opposite side frames of the bag or valise, one of which carries a staple or equivalent locking device, $a$, which, when the bag is closed, projects through a slot, $a'$, in the other frame and receives a padlock or other suitable fastening.

On the top bar of the frame A' are guided sliding bolts B, which are connected, by pivoted bell-crank levers D at the ends of the frame, to bolts F, guided on the side bars of the frame, said side bolts having notches $b$ at their lower ends, and the top bolts having slots $d$, terminating in enlarged openings $d'$.

On the frame A are projecting pins $f$, having enlarged heads, as shown in Fig. 2, and when the bag is closed by bringing the frames A A' together the enlarged heads of the pins on the top bar of the frame A pass through the openings in the top bar of the frame A', and through the enlarged openings $d'$ in the bolts B, while the pins of the side bars of the frame pass beneath the bolts F, the stems of the said side pins being in line with the notches $b$ in the side bolts.

When the frames have been drawn together, the top bolts are forced apart by pressure upon the thumb-pieces $g$, the slots $d$ in said bolts receiving the shanks of the top pins $f$, and said slotted portions of the bolts engaging with the enlarged heads of the pins, as shown in Fig. 2. A downward movement is at the same time imparted to the side bolts, F, owing to the intervention of the bell-crank levers D, so that the notches $b$ of said side bolts receive the stems of the side pins $f$, and the lower portions of the bolts engage with the heads of said pins. By this means the headed pins serve as retaining-catches for the bolts; hence the two frames are firmly locked together both at the top and at the sides, and will be retained in this locked condition by reason of the engagement of the staples $a$ or equivalent locking device with the adjacent ends of the bolts B. On the removal of said locking device, however, the bolts B can be drawn together by means of the thumb-pieces $g$, and the side bolts thus raised until the enlarged heads of the pins $f$ are free from engagement with all of the bolts. The slots or notches in the top and side bolts may be such that the pins will engage with the top bolts before they engage with the side bolts, the top of the bag being first retained and attention then directed to drawing the sides of the bag together and holding them by a further slipping of the bolts.

The bell-crank levers D are preferably slotted to receive the pins whereby they are connected to the bolts B and F, because of the arc of a circle in which said ends move; or the ends of the bolts may be slotted for the same purpose.

The lower ends of the bolts F need not necessarily be notched, as they may simply be thrust behind the heads of the side bolts, F, and, if desired, a single locking-bolt, B, on the top bar of the frame may be used in place of two bolts, such construction being shown in Fig. 4. In this case one of the side bolts, F, is operated by an upward and the other by a downward movement, and the top bolt, B, is held in the locked position by reason of the bolt $i$ of a lock carried by one of the frames A A', said bolt entering a slot, $i'$, in the bolt B.

Where a positive connection of the top and side bolts is not considered necessary, the adjacent ends of said bolts may be simply beveled, as shown in Fig. 5, for instance, and, if desired, the bolts B may in either case be acted upon by springs $h$, tending to maintain the bolts in a locked position at all times, the pins $f$ in this case having beveled heads, as shown in Fig.

6, so that when the frames A A' are drawn together these beveled heads will effect the automatic retraction of the bolts, the latter springing in behind the heads when the bag is closed. When the two bolts are positively connected, a spring similar to the spring $h$, but acting in the opposite direction, may be used to retract the bolts and unlock the same.

I have shown the locking-bolts arranged on the outside of one of the frames of the bag; but it will be evident that said bolts can be placed on the inside of the frame, if desired, the locking devices being in this case entirely concealed when the bag is closed.

I am aware that the use of sliding bolts and headed pins in a bag fastening is not new, and I therefore do not broadly claim this combination; but

I claim as my invention and desire to secure by Letters Patent—

1. The combination of the frames of a bag or valise, retaining-catches on one frame, and top and side bolts carried by the other frame, and having portions which engage with or are released from said catches as the bolts are moved, said top and side bolts being joined at the corners of the frame, whereby each side bolt is controlled by the top bolt, all substantially as specified.

2. The combination of the frames of a bag or valise, retaining-catches on one frame, top and side bolts carried by the other frame, joined at the corners thereof, and having portions which engage with or are released from the catches as the bolts are moved, and a locking device acting on the top bolts and serving to prevent retraction of the same, all substantially as specified.

3. The combination of the frames of a bag or valise, retaining-catches on one frame, top and side bolts carried by the other frame, and having portions which engage with or are released from said catches as the bolts are moved, and levers whereby the top and side bolts are joined at the corners of the frame, all substantially as specified.

In testimony whereof I have signed my name to this specification in the presence of two subscribing witnesses.

HENRY W. MORROW.

Witnesses:
JOHN T. LEWIS,
HARRY SMITH.